US012122362B2

(12) United States Patent
Okumura

(10) Patent No.: US 12,122,362 B2
(45) Date of Patent: Oct. 22, 2024

(54) OBJECT RECOGNITION APPARATUS AND DRIVING ASSISTANCE SYSTEM

(71) Applicant: DENSO CORPORATION, Kariya (JP)

(72) Inventor: Sho Okumura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/900,688

(22) Filed: Jun. 12, 2020

(65) Prior Publication Data

US 2020/0391728 A1    Dec. 17, 2020

(30) Foreign Application Priority Data

Jun. 13, 2019  (JP) .................................. 2019-110369

(51) Int. Cl.
| | |
|---|---|
| *B60W 30/08* | (2012.01) |
| *B60R 11/04* | (2006.01) |
| *B60W 50/14* | (2020.01) |
| *G06V 20/56* | (2022.01) |

(52) U.S. Cl.
CPC ............ *B60W 30/08* (2013.01); *B60W 50/14* (2013.01); *G06V 20/56* (2022.01); *B60R 11/04* (2013.01); *B60W 2050/143* (2013.01); *B60W 2420/403* (2013.01); *B60W 2554/402* (2020.02); *B60W 2554/4042* (2020.02); *B60W 2554/4043* (2020.02); *B60W 2554/801* (2020.02); *B60W 2554/802* (2020.02)

(58) Field of Classification Search
CPC ........... B60W 30/08; B60W 2050/143; B60W 2420/42; G06K 9/00791; B60R 11/04
See application file for complete search history.

(56) References Cited

U.S. PATENT DOCUMENTS

| | | | | |
|---|---|---|---|---|
| 2010/0286875 | A1* | 11/2010 | Inoue ................... | B62D 15/027 |
| | | | | 701/49 |
| 2015/0234044 | A1* | 8/2015 | Ouchi .................... | G01S 13/93 |
| | | | | 342/118 |
| 2016/0292905 | A1* | 10/2016 | Nehmadi ................ | G01S 19/03 |

(Continued)

FOREIGN PATENT DOCUMENTS

JP            5411671 B2       11/2013

*Primary Examiner* — Jelani A Smith
*Assistant Examiner* — Toya Pettiegrew
(74) *Attorney, Agent, or Firm* — MASCHOFF BRENNAN

(57) ABSTRACT

In an object recognition apparatus to be mounted to a vehicle equipped with a driving assistance apparatus. In the object recognition apparatus, a distance detector is configured to repeatedly detect an instantaneous distance from the vehicle to an object located around the vehicle. A distance change determiner is configured to perform a determination regarding the instantaneous distance that is a determination as to whether the currently detected instantaneous distance to the object is less than the previously detected instantaneous distance to the same object and an amount of change in instantaneous distance between the currently detected instantaneous distance and the previously detected instantaneous distance is greater than a predetermined amount-of-change threshold. And, an inhibitor is configured to, in response to a result of determination by the distance change determiner being affirmative, output to the driving assistance apparatus an inhibition signal to inhibit activation of the driving assistance apparatus.

10 Claims, 5 Drawing Sheets

(56) References Cited

U.S. PATENT DOCUMENTS

2019/0017486 A1\* 1/2019 Kuretake ........ B60W 30/18018
2019/0061766 A1\* 2/2019 Nishiguchi ........... B60W 10/06
2020/0298853 A1\* 9/2020 Bast ....................... G08G 1/166

\* cited by examiner

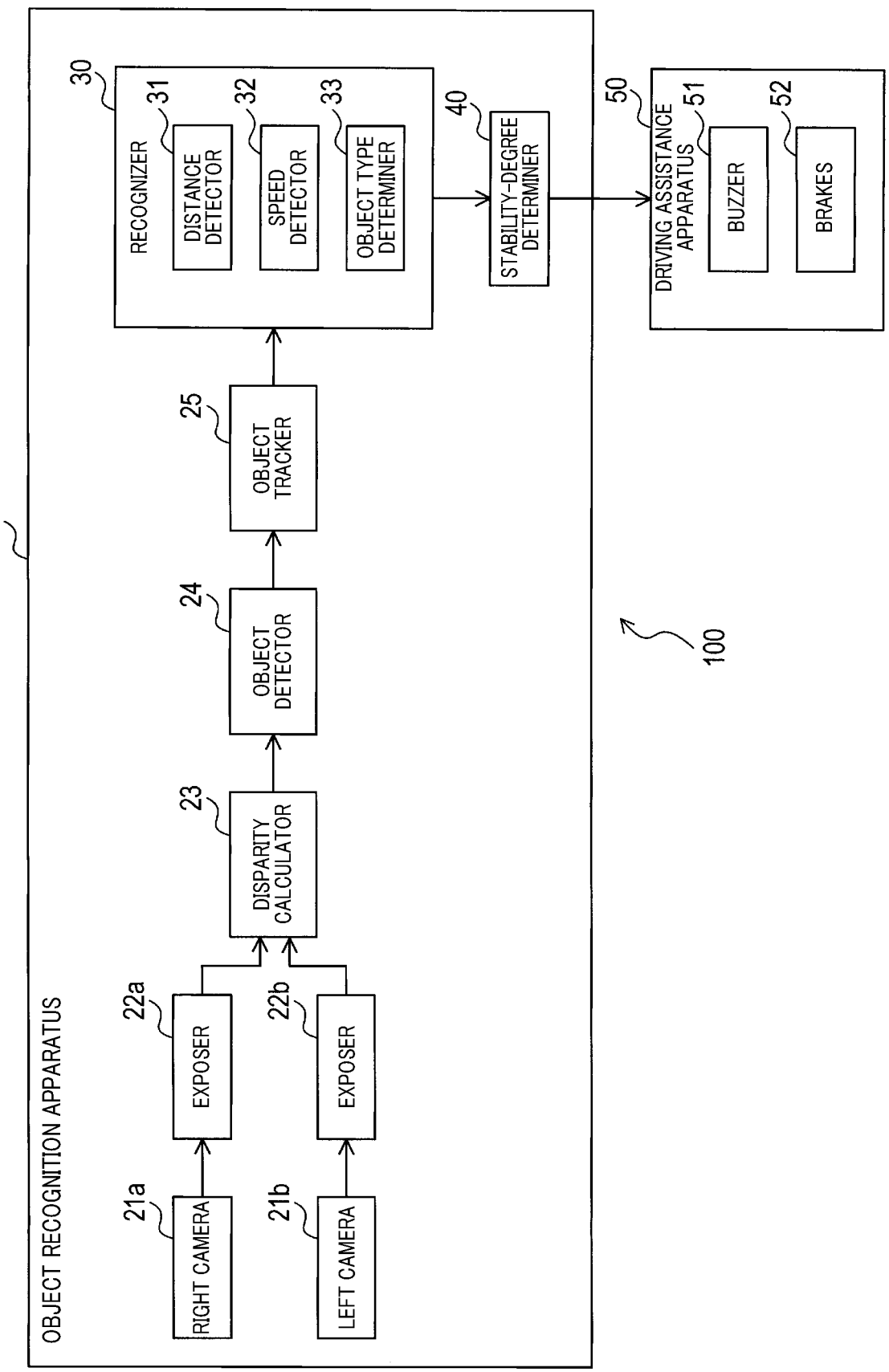

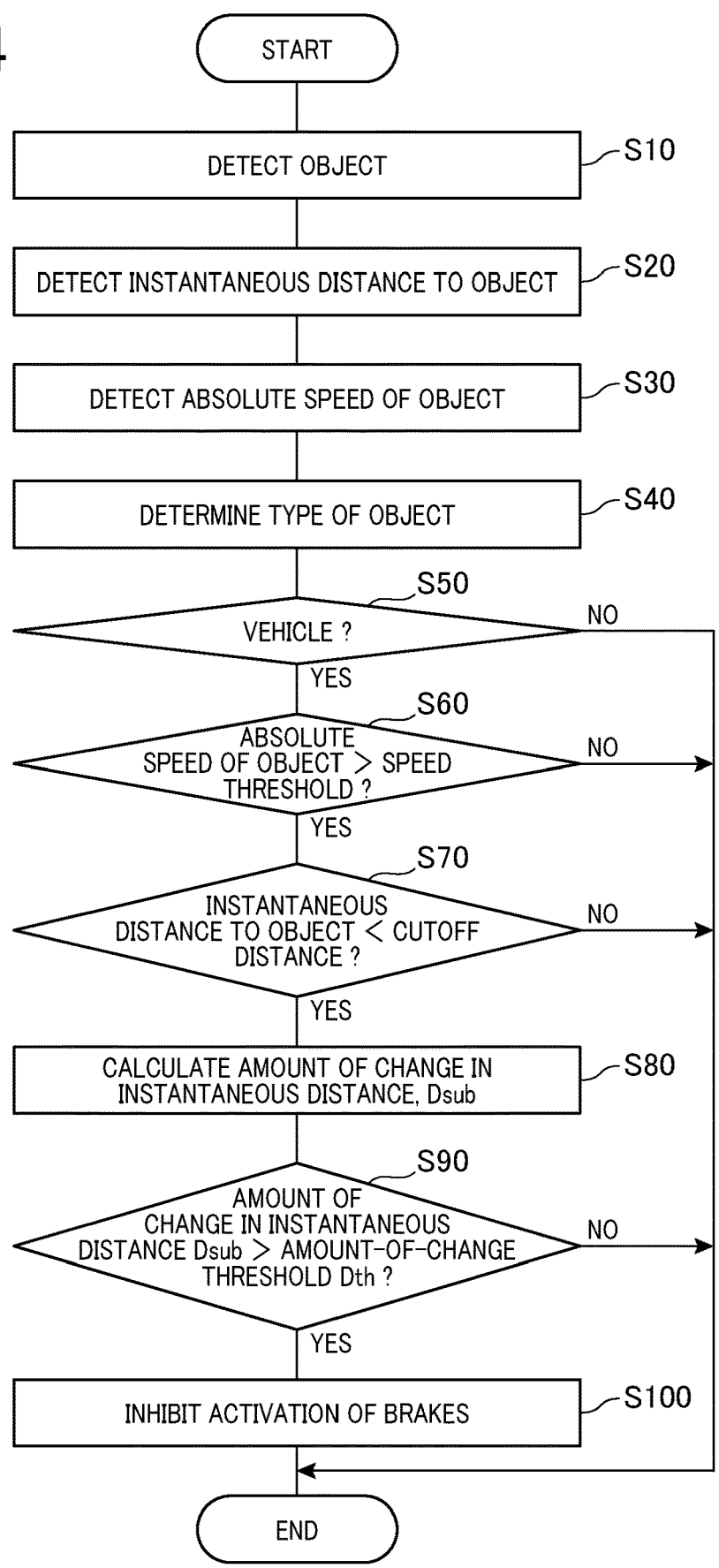

OBJECT RECOGNITION APPARATUS AND DRIVING ASSISTANCE SYSTEM

CROSS-REFERENCE TO RELATED APPLICATION

This application is based on and claims the benefit of priority from earlier Japanese Patent Application No. 2019-110369 filed on Jun. 13, 2019, the description of which is incorporated herein by reference.

BACKGROUND

Technical Field

This disclosure relates to a technique for recognizing objects located around a vehicle carrying the driving assistance system.

Related Art

A known driving assistance system calculates a distance to an object located around a vehicle based on images captured by a stereo camera, and performs driving assistance using the calculated distance. Assuming that the object is a truck with a truck bed, if a tailgate of the truck bed is appearing in the captured image, a distance to the tailgate is calculated as a distance to the object. However, if the tailgate of the truck bed is missing in the captured image, a distance to a front wall of the truck bed will be calculated as a distance to the object. Thus, a change from a frame having the tailgate appearing to a frame having the tailgate missing will cause a distance jump such that the distance from the vehicle to the object significantly increases between consecutive frames.

BRIEF DESCRIPTION OF THE DRAWINGS

In the accompanying drawings:

FIG. 1A is a block diagram of a driving assistance system;

FIG. 4 is a flowchart of an object recognition process.

DESCRIPTION OF SPECIFIC EMBODIMENTS

Figure 1B:
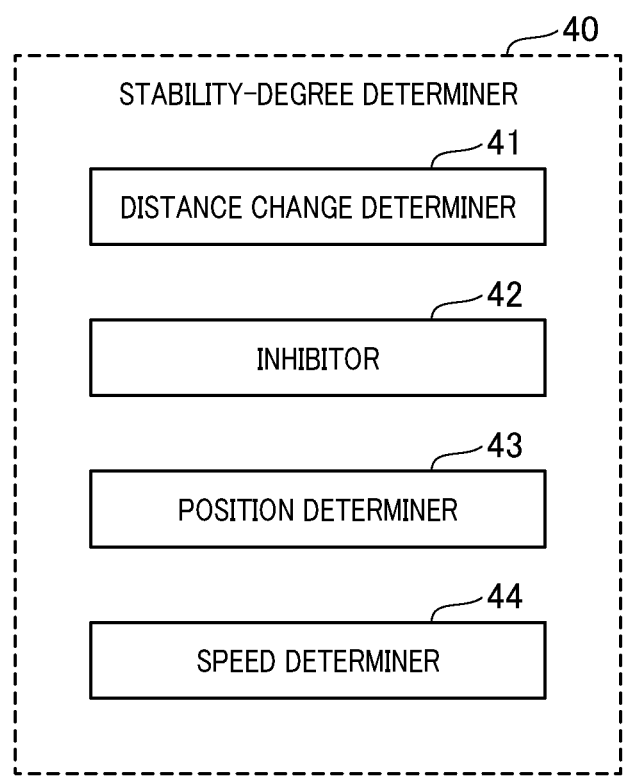
FIG. 1B is a functional block diagram of a stability-degree determiner.

The above driving assistance system, as disclosed in, for example, Japanese Patent No. 5411671, is configured to, in response to determining that the tailgate of the truck bed is missing in the captured image, calculate a distance to the tailgate based on statistical information about past frames. This can prevent the driving assistance system from detecting that the object has moved far away from the vehicle, even in cases where a change has occurred from a frame having the tailgate appearing to a frame having the tailgate missing, thereby preventing braking control from being delayed.

The above driving assistance system is configured to prevent erroneous behaviors of the driving assistance apparatus in cases where a change has occurred from a frame having the tailgate appearing to a frame having the tailgate missing. However, the present inventors have found that an erroneous behavior of the driving assistance control caused by misrecognition of an end position of the object based on the distance to the object may also occur other than in cases where a distance jump has occurred in a direction as if the object moved far away from the vehicle.

It is therefore desired to have a technique for preventing erroneous behaviors of a driving assistance apparatus caused by misrecognition of an end position of an object located around a vehicle.

One aspect of this disclosure provides an object recognition apparatus to be mounted to a vehicle equipped with a driving assistance apparatus. In the object recognition apparatus, a distance detector is configured to repeatedly detect an instantaneous distance from the vehicle to an object located around the vehicle. A distance change determiner is configured to perform a determination regarding the instantaneous distance that is a determination as to whether the currently detected instantaneous distance to the object is less than the previously detected instantaneous distance to the same object and an amount of change in instantaneous distance between the currently detected instantaneous distance and the previously detected instantaneous distance is greater than a predetermined amount-of-change threshold. An inhibitor is configured to, in response to the distance change determiner determining that the currently detected instantaneous distance to the object is less than the previously detected instantaneous distance to the same object and the amount of change in instantaneous distance between the currently detected instantaneous distance and the previously detected instantaneous distance is greater than the predetermined amount-of-change threshold, output to the driving assistance apparatus an inhibition signal to inhibit activation of the driving assistance apparatus.

With the above configuration, it is determined whether the currently detected instantaneous distance to the object is less than the previously detected instantaneous distance to the same object and an amount of change in instantaneous distance between the currently detected instantaneous distance and the previously detected instantaneous distance is greater than a predetermined amount-of-change threshold. That is, it is determined whether a distance jump has occurred between consecutive frames in a direction in which the object approaches the vehicle. Typically, when an object located around the vehicle has rapidly approached the vehicle, the driving assistance apparatus is activated, where the speed of the vehicle is decreased by braking to avoid a collision with the object and/or a buzzer is sounded to prompt a driver of the vehicle to perform collision avoidance operations.

In cases where a distance jump has occurred between consecutive frames in a direction in which the object approaches the vehicle even though the vehicle is not likely to collide with the object, the inhibition signal to inhibit activation of the driving assistance apparatus will be output. This configuration can prevent erroneous behaviors of the driving assistance apparatus caused by misrecognition of an end position of the object, even if a distance jump occurs in a direction in which the object approaches the vehicle.

Hereinafter, exemplary embodiments of the present disclosure will be described in detail with reference to the accompanying drawings, in which like reference numerals refer to like or similar elements regardless of reference numerals and duplicated description thereof will be omitted.

1. Overall Configuration

A driving assistance system 100 according to one embodiment of the present disclosure will now be described with reference to FIGS. 1A, 1B.

Referring to FIG. 1A, the driving assistance system 100 includes an object recognition apparatus 10 and a driving assistance apparatus 50 to provide assistance to driving of a vehicle 60.

The object recognition apparatus 10 includes a right camera 21a, a left camera 21b, exposers 22a, 22b, a disparity calculator 23, an object detector 24, an object tracker 25, a recognizer 30, and a stability-degree determiner 40.

The right camera 21 and the left camera 21b include respective image sensors such as CCD sensors, CMOS sensors or the like in synchronization with each other to constitute a stereo camera. The right camera 21a and the left camera 21b are installed inside a front windshield of the vehicle 60 with a predetermined widthwise spacing therebetween and at the same height from a road surface. The exposers 22a, 22b are configured to repeatedly open and close shutters of the right camera 21a and the left camera 21b to illuminate the image sensors of the right camera 21a and the left camera 21b, thereby implementing imaging by the right camera 21a and the left camera 21b. The right camera 21a and the left camera 21b are each configured to capture images of surroundings of the vehicle 60 with a predefined period (e.g., 0.1 seconds).

The disparity calculator 23 provides a function implemented by an image processor or the like. Each time a pair of left and right images are captured by the right camera 21a and the left camera 21b, the disparity calculator 23 converts analog data of the left and right captured images into digital data such that each pixel has a luminance value corresponding to one of a prescribed number of levels of luminance. The disparity calculator 23 performs stereo matching between left and right digital images to calculate disparity, thereby generating a range image.

The object detector 24, the object tracker 25, the recognizer 30, and the stability-degree determiner 40 have functions implemented by at least one microcomputer including a CPU (Central Processing Unit: processor), a read only memory (ROM), a random access memory (RAM), an input/output interface (I/O), and other components. These functions may be implemented by the CPU executing one or more computer programs stored in a non-transitory memory, such as the ROM. The object detector 24 is configured to detect an object located around the vehicle 60 from the range image generated by the disparity calculator 23. The object tracker 25 is configured to associate the currently detected object with the previously detected object as the same object.

The recognizer 30 includes a distance detector 31, a speed detector 32, and an object type determiner 33, and is configured to repeatedly detect and recognize an instantaneous distance from the vehicle 60 to an object (more specifically, a rearmost end of the object), an absolute speed of the object relative to a road surface, and a type of the object. The stability-degree determiner 40 is configured to output a recognition result by the recognizer 30 to the driving assistance apparatus 50. The stability-degree determiner 40 is configured to determine a stability degree of the recognition result by the recognizer 30 based on the recognition result, and if the stability degree of the recognition result is relatively low, output to the driving assistance apparatus 50 an inhibition signal to inhibit activation of the driving assistance apparatus 50.

For example, the stability-degree determiner 40 is configured to, if an instantaneous distance to an object detected from the current frame is less than an instantaneous distance to the same object detected from the previous frame and an amount of change in instantaneous distance between these two consecutive frames, Dsub, is greater than a predetermined amount-of-change threshold Dth, determine that the stability degree of the recognition result is relatively low and then output the inhibition signal to the driving assistance apparatus 50.

Such a distance jump that the instantaneous distance to the same object significantly decreases between consecutive frames is likely to take place in cases where the object has a specific shape. More specifically, the specific shape may be a shape such that a lower side portion of the vehicle (a nearest side portion of the vehicle from a road surface) projects more rearward than an upper side portion of the vehicle. That is, the specific shape is, as viewed from the rear of the vehicle, a shape such that there is a difference between a distance to the lower side portion of the vehicle and a distance to the upper side portion of the vehicle. A bed-attached truck is an example of an object having such a specific shape.

Figure 2:
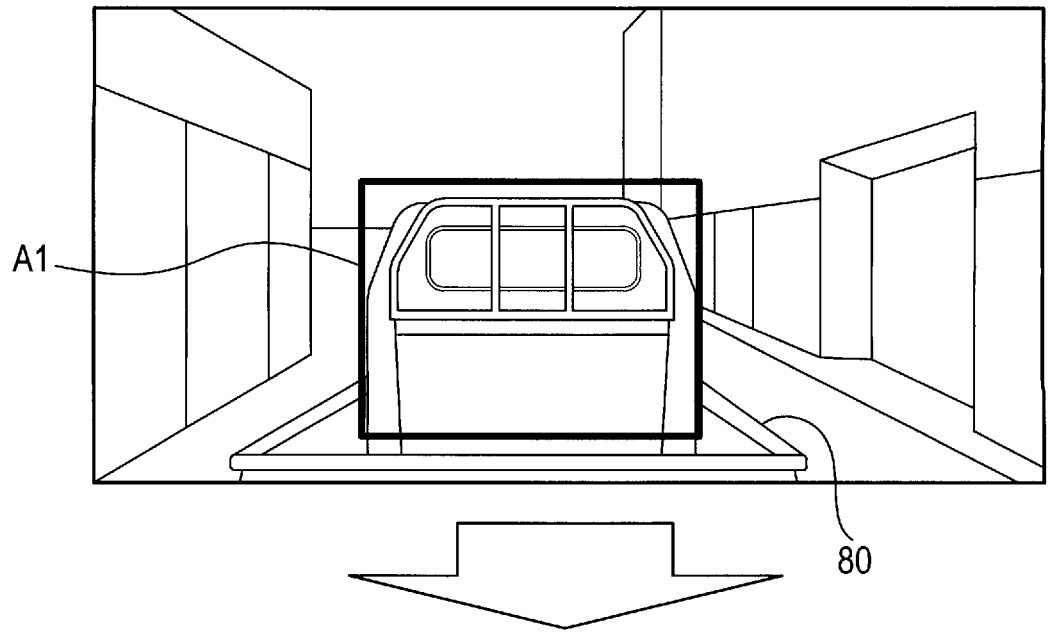
FIG. 2 is an example change from a frame having a truck bed missing in a field of view to a frame having the truck bed appearing in the field of view.
Figure 2:
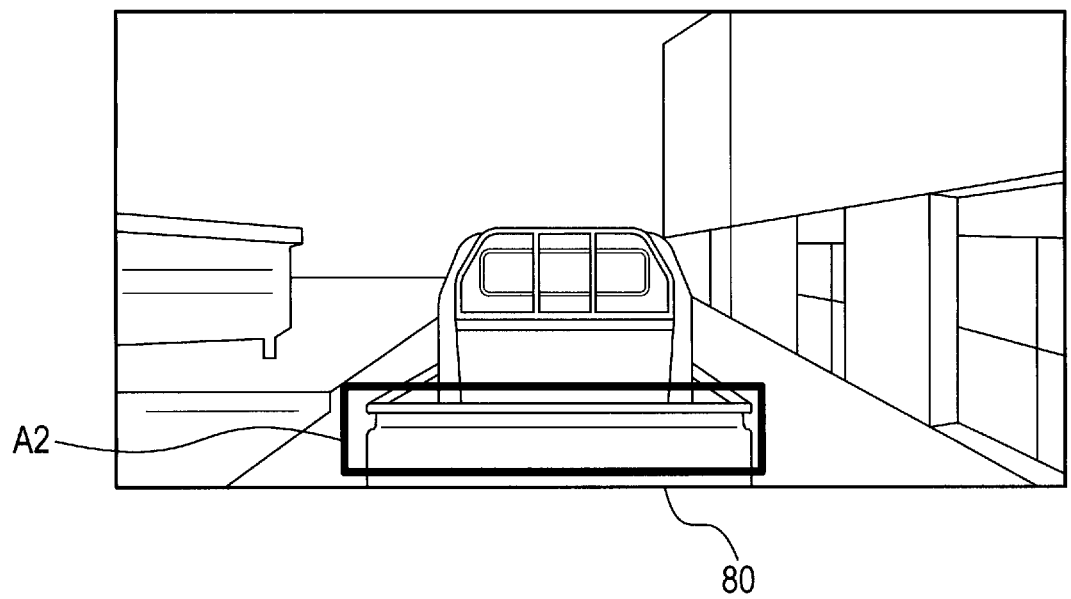
Figure 3:
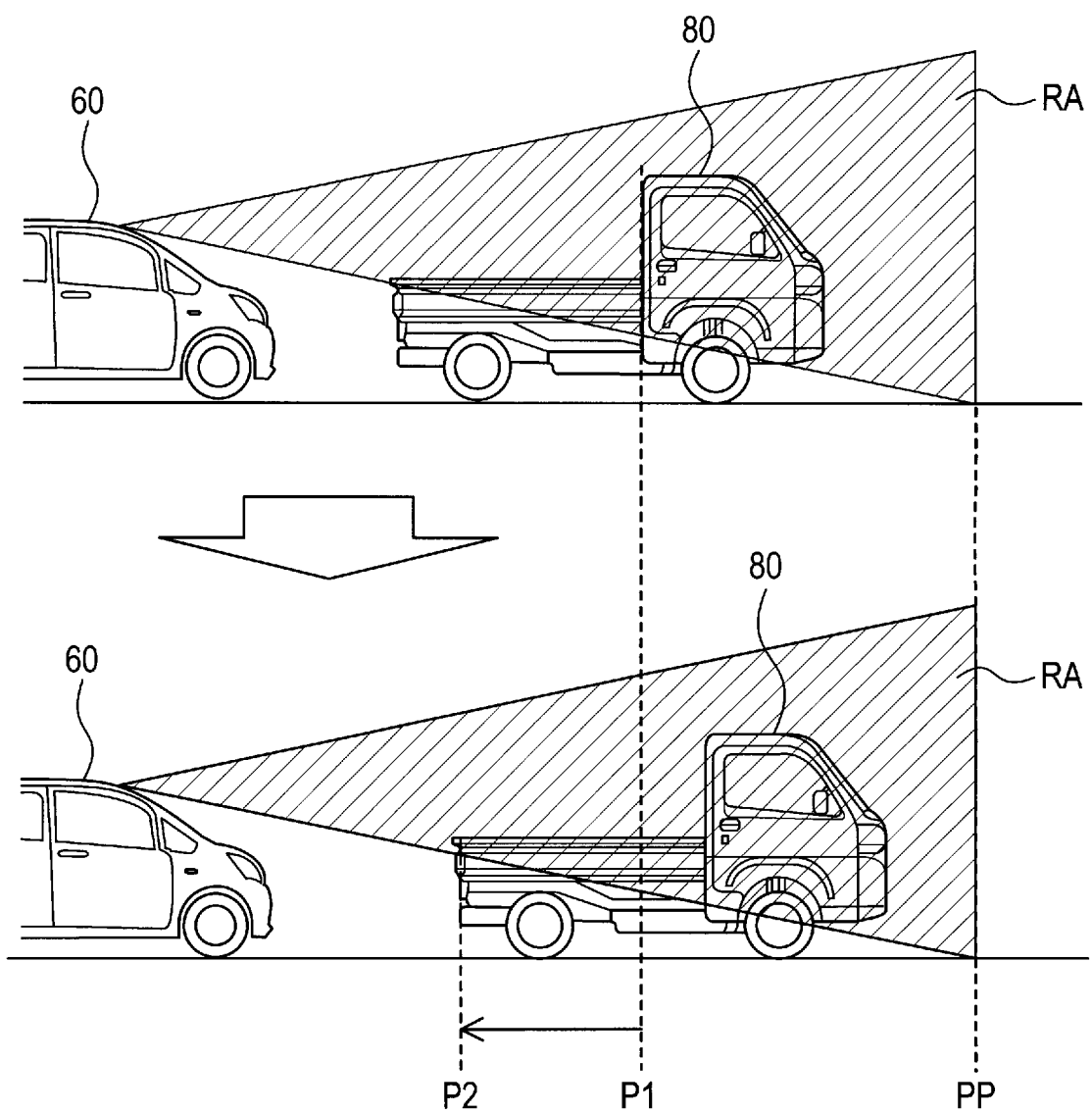
FIG. 3 is an example change from an instantaneous distance detected when the truck bed is missing in a field of view to an instantaneous distance detected when the truck bed is appearing in the field of view.

Referring to FIGS. 2 and 3, a frame in which the tailgate of the truck bed of the bed-attached truck 80 (hereinafter referred to as a truck 80) is not appearing in the field of view RA of the right camera 21a and the left camera 21b leads to a distance P1 to a front wall of the truck bed or a rear side of a cab detected as a distance from the vehicle 60 to the object. A frame in which the tailgate of the truck bed of the truck 80 is appearing in the field of view RA of the right camera 21a and the left camera 21b leads to a distance P2 to the tailgate of the truck bed of the truck 80 detected as a distance from the vehicle 60 to the object.

The driving assistance apparatus 50 will recognize from the distance change from the distance P1 to the distance P2 that the truck 80 is rapidly approaching the vehicle 60 even though the truck 80 is not rapidly approaching the vehicle 60. As a result, the driving assistance apparatus 50 may erroneously behave to avoid a collision between the vehicle 60 and the truck 80. The stability-degree determiner 40 is configured to output the inhibition signal to inhibit activation of the driving assistance apparatus 50 in response to a significant decrease in the distance from the vehicle 60 to the same object between consecutive frames. In the present embodiment, the stability-degree determiner 40 includes, as functional blocks, a distance change determiner 41, an inhibitor 42, a position determiner 43, and a speed determiner 44 (see FIG. 1B). The distance change determiner 41 is responsible for execution of steps S80, S90, the inhibitor 42 is responsible for execution of step S100, the position determiner 43 is responsible for execution of step S70, and the speed determiner 44 is responsible for execution of steps S60 (see FIG. 1B).

An object having a specific shape as defined as above is not limited to a bed-attached truck, but may be heavy machinery with an arm directed backward, a car-carrying trailer with no cars loaded, a vehicle with shipments, such as wood materials, loaded to the lower portion of the vehicle and significantly projecting backward, or the like. In cases where an arm of heavy machinery loaded on the truck bed with the arm directed backward is appearing in the field of view, a distance to the arm of the heavy machinery will be detected as a distance to the object. In cases where an arm of heavy machinery loaded on the truck bed with the arm directed backward is not appearing in the field of view, a distance to a body of the heavy machinery will be detected as a distance to the object.

The driving assistance apparatus 50 includes at least one microcomputer, a buzzer 51, and brakes 52. The microcomputer includes a central processing unit (CPU), a read only memory (ROM), a random access memory (RAM), an input/output interface (I/O), and other components, The driving assistance apparatus 50 is configured to be activated in response to determining based on the recognition result output from the object recognition apparatus 10 that a risk of collision between the vehicle 60 and the object is higher than a first threshold. More specifically, the driving assistance apparatus 50 activates the buzzer 51 to provide a forward collision warning. The driving assistance apparatus 50 is further configured to, in response to the risk of collision between the vehicle 60 and the object exceeding a second threshold that is above the first threshold, activate the brakes 52 to decrease the speed of the vehicle 60 via autonomous emergency braking.

The driving assistance apparatus 50 is configured to, in response to receiving the inhibition signal from the object recognition apparatus 10, inhibit activation of the driving assistance apparatus 50 even in cases where it is determined that the collision risk is relatively high. For example, the driving assistance apparatus 50 may be configured to inhibit activation of the brakes 52 and only activate the buzzer 51 even in cases where the risk of collision is higher than the second threshold. Or, the driving assistance apparatus 50 may be configured to inhibit activation of the buzzer 51 even in cases where the risk of collision is higher than the first threshold.

When the vehicle 60 approaches a preceding vehicle at a certain speed (for example, 50 km/h) or higher, a distance jump such that the instantaneous distance to the object significantly decreases between the current frame and the previous frame may occur even if the preceding vehicle does not have any specific shape as defined above. However, in such a case, the driving assistance apparatus 50 will be actuated during the previous frame even if activation of the driving assistance apparatus 50 is inhibited during the current frame. Therefore, it is unlikely that hindrances to driving of the vehicle will occur.

2. Object Recognition Process

A process of recognizing an object (hereinafter also referred to as an object recognition process) will now be explained with reference to a flowchart of FIG. 4. This process is performed in the object recognition apparatus 10.

At step S10, the object detector 24 detects an object from a range image. Subsequently, at step S20, the distance detector 31 detects an instantaneous distance to the object detected at step S10. At step S30, the speed detector 32 detects an absolute speed of the object detected at step S10, where the speed detector 32 calculates the absolute speed of the object using an amount of movement of the object between consecutive frames and a speed of the vehicle 60. At step S40, the object type determiner 33 determines a type of the object detected at step S10 using template matching or the like.

Subsequently, at step S50, the stability-degree determiner 40 determines whether the type of the object determined at step S40 is a vehicle. If at step S50 it is determined that the type of the object determined at step S40 is not a vehicle, then the process flow ends. If at step S50 it is determined that the type of the object determined at step S40 is a vehicle, then the process flow proceeds to step S60.

At step S60, the stability-degree determiner 40 determines whether the absolute speed of the object detected at step S30 is greater than a predetermined speed threshold. This speed threshold is provided to determine whether the vehicle 60 is moving. If at step S60 it is determined that the absolute speed of the object is equal to or less than the speed threshold, then the process flow ends. If at step S60 it is determined that the absolute speed of the object is greater than the speed threshold, then the process flow proceeds to step S70.

At step S70, the stability-degree determiner 40 determines whether the instantaneous distance to the object calculated at step S20 is less than a cutoff distance that is a distance to a predetermined lower-end cutoff position PP. As shown in FIG. 3, the lower-end cutoff position PP is a position determined depending on the field of view RA. More specifically, the lower-end cutoff position PP is a position closest to both the right camera 21*a* and the left camera 21*b*, and at which position, a road surface is included in the field of view RA. If a rear end portion of the object is located forward of the lower-end cutoff position PP, a distance jump caused by the rear end portion of the object missing in the field of view RA will not occur. At step S70, the stability-degree determiner 40 determines whether a distance jump such that the instantaneous distance to the object significantly decreases between consecutive frames can occur. If at step S70 it is determined that the instantaneous distance to the object calculated at step S20 is equal to or greater than the cutoff distance, the process flow ends. If at step S70 it is determined that the instantaneous distance to the object calculated at step S20 is less than the cutoff distance, then the process flow proceeds to step S80.

At step S80, the stability-degree determiner 40 calculates an amount of change in instantaneous distance, Dsub, by subtracting the instantaneous distance to the object calculated from the current frame from the instantaneous distance to the same object calculated from the previous frame.

Subsequently, at step S90, the stability-degree determiner 40 determines whether the amount of change in instantaneous distance, Dsub, calculated at step S80 is greater than a predetermined amount-of-change threshold Dth. That is, at step S90, it is determined whether the instantaneous distance to the object detected from the current frame is less than the instantaneous distance to the same object detected from the previous frame and the amount of change in instantaneous distance between these two consecutive frames, Dsub, exceeds the predetermined amount-of-change threshold Dth. If at step S90 it is determined that the amount of change in instantaneous distance, Dsub, is equal to or less than the predetermined amount-of-change threshold Dth, then the process flow ends. If at step S90 it is determined that the amount of change in instantaneous distance, Dsub, is greater than the predetermined amount-of-change threshold Dth, then the process flow proceeds to step S100. In the present embodiment, the process at step S90 corresponds to a determination regarding the instantaneous distance.

At step S100, the stability-degree determiner 40 outputs to the driving assistance apparatus 50 the inhibition signal to inhibit activation of the brakes 52. Alternatively, the stability-degree determiner 40 may output to the driving assistance apparatus 50 the inhibition signal to inhibit activation of the buzzer 51. Thereafter, the process flow ends.

3. Advantages

The present embodiment configured as above can provide the following advantages.

(1) It is determined whether the instantaneous distance to the object detected from the current frame is less than the instantaneous distance to the same object detected from the previous frame and the amount of change in instantaneous distance between these two consecutive frames, Dsub, is greater than the predetermined amount-of-change threshold Dth. If the answer is affirmative, then the inhibition signal to inhibit activation of the driving assistance apparatus 50 will be output from the object recognition apparatus 10 to the driving assistance apparatus 50. This configuration can prevent erroneous behaviors of the driving assistance apparatus 50 caused by misrecognition of an end position of the object, even in cases where a distance jump occurs in a direction in which the object approaches the vehicle 60.

(2) It is determined whether the currently detected instantaneous distance is less than the cutoff distance that is a distance from the vehicle 60 to the lower-end cutoff position PP. If the answer is affirmative, then a distance determination process (at step S90) is performed. With this configuration, the determination regarding the instantaneous distance is performed only in cases where an erroneous behavior of the driving assistance apparatus 50 may occur, which can avoid unnecessary inhibition of activation of the driving assistance apparatus 50.

(3) An absolute speed of the object is detected. It is determined whether the detected absolute speed of the object is equal to or greater than the speed threshold. If it is determined that the detected absolute speed of the object is equal to or greater than the speed threshold, then the determination regarding the instantaneous distance is performed. This configuration can avoid unnecessary inhibition of activation of the driving assistance apparatus 50.

(4) A type of the object is determined or identified. If the determined type of the object is a vehicle, the determination regarding the instantaneous distance is performed. This configuration can avoid unnecessary inhibition of activation of the driving assistance apparatus 50.

(5) The driving assistance apparatus 50 inhibits activation of the buzzer 51 and/or the brakes 52 in response to receipt of the inhibition signal output from the object recognition apparatus 10. This configuration can prevent erroneous activation of the buzzer 51 and/or the brakes 52 caused by misrecognition of an end position of the object located around the vehicle 60.

Modifications

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

(a) The driving assistance apparatus 50 according to the above embodiment includes both the buzzer 51 and the brakes 52. In some alternative embodiments, the driving assistance apparatus 50 may include either or both of the buzzer 51 and the brakes 52.

(b) The functions of the object recognition apparatus 10 may not be necessarily implemented by software, but some or all of the functions may be implemented using one or more hardware units. For example, when the foregoing functions are implemented by an electronic circuit as hardware, the electronic circuit may be implemented by a digital circuit or an analog circuit, or a combination of them.

(c) A plurality of functions possessed by one constituent element in the foregoing embodiments may be implemented by a plurality of constituent elements, or one function possessed by one constituent element may be implemented by a plurality of constituent elements. In addition, a plurality of functions possessed by a plurality of constituent elements may be implemented by one constituent element, or one function implemented by a plurality of constituent elements may be implemented by one constituent element. Some of the components in the foregoing embodiments may be omitted. At least some of the components in the foregoing embodiments may be added to the other components in the foregoing embodiments or may replace with the other components in the foregoing embodiments.

(d) Besides the object recognition apparatus described above, the present disclosure can be implemented in various modes such as a system including the object recognition apparatus as a constituent element, a program for causing a computer to serve as the object recognition apparatus, a non-transitory and tangible storage medium such as a semiconductor memory storing this program, an object recognition method, and others.

What is claimed is:

1. An object recognition apparatus to be mounted to a vehicle equipped with a driving assistance apparatus, the object recognition apparatus comprising:

a non-transitory memory storing one or more computer programs a processor executing the one or more computer programs to:

repeatedly detect an instantaneous distance from the vehicle to an object located around the vehicle from images captured by a vehicle-mounted camera;

determine whether a currently detected instantaneous distance to the object is less than a cutoff distance that is a predetermined distance from the vehicle to a lower-end cutoff position, the lower-end cutoff position is a position closest to a vehicle-mounted camera, and at which position a road surface is included in a field of view of the vehicle-mounted camera;

for a state in which the currently detected instantaneous distance is determined to be less than the cutoff distance, perform a determination regarding the instantaneous distance that is a determination as to whether the currently detected instantaneous distance to the object is less than a previously detected instantaneous distance to the same object and an amount of change in instantaneous distance between the currently detected instantaneous distance and the previously detected instantaneous distance is greater than a predetermined amount-of-change threshold for determining that a distance jump arising from a specific shape of the object has occurred between the previously detected instantaneous distance and the currently detected instantaneous distance, the specific shape of the object being a shape such that a lower side portion of the object, which is a nearest side portion of the object from a road surface, projects more rearward than an upper side portion of the object; and in response to determining that the currently detected instantaneous distance to the object is less than the previously detected instantaneous distance to the same object and determining that the amount of change in instantaneous distance between the currently detected instantaneous distance and the previously detected instantaneous distance is greater than the predetermined amount-of-change threshold, output to the driving assistance apparatus an inhibition signal to inhibit activation of at least one function of the driving assistance apparatus.

2. The object recognition apparatus according to claim 1, wherein the processor further executes one or more programs to:
detect an absolute speed of the object; determine whether the absolute speed detected is greater than a predetermined speed threshold; and
in response to determining that the absolute speed of the object is greater than the predetermined speed threshold, perform the determination regarding the instantaneous distance.

3. The object recognition apparatus according to claim 1, wherein the processor further executes one or more programs to:
determine a type of the object; and
in response to determining that the type of the object is a vehicle, perform the determination regarding the instantaneous distance.

4. A driving assistance system to be mounted to a vehicle, comprising an object recognition apparatus and a driving assistance apparatus,
wherein the object recognition apparatus comprises:
a non-transitory memory storing one or more computer programs
a processor executing the one or more computer programs to:
repeatedly detect an instantaneous distance from the vehicle to an object located around the vehicle from images captured by a vehicle-mounted camera;
determine whether a currently detected instantaneous distance to the object is less than a cutoff distance that is a predetermined distance from the vehicle to a lower-end cutoff position, the lower-end cutoff position is a position closest to a vehicle-mounted camera, and at which position a road surface is included in a field of view of the vehicle-mounted camera;
for a state in which the currently detected instantaneous distance is determined to be less than the cutoff distance, perform a determination regarding the instantaneous distance that is a determination as to whether the currently detected instantaneous distance to the object is less than a previously detected instantaneous distance to the same object and an amount of change in instantaneous distance between the currently detected instantaneous distance and the previously detected instantaneous distance is greater than a predetermined amount-of-change threshold for determining that a distance jump arising from a specific shape of the object has occurred between the previously detected instantaneous distance and the currently detected instantaneous distance, the specific shape of the object being a shape such that a lower side portion of the object, which is a nearest side portion of the object from a road surface, projects more rearward than an upper side portion of the object; and in response to determining that the currently detected instantaneous distance to the object is less than the previously detected instantaneous distance to the same object and determining that the amount of change in instantaneous distance between the currently detected instantaneous distance and the previously detected instantaneous distance is greater than the predetermined amount-of-change threshold, output to the driving assistance apparatus an inhibition signal to inhibit activation of at least one function of the driving assistance apparatus,
wherein the processor further executes one or more programs to:
determine whether the currently detected instantaneous distance to the object is less than a cutoff distance that is a predetermined distance from the vehicle to a lower-end cutoff position; and
in response to determining that the currently detected instantaneous distance is less than the cutoff distance, perform the determination regarding the instantaneous distance,
the lower-end cutoff position is a position closest to a vehicle-mounted camera, and at which position a road surface is included in a field of view of the vehicle-mounted camera, and
wherein the driving assistance apparatus is configured to, in response to receiving the inhibition signal, inhibit activation of the at least one function of the driving assistance apparatus.

5. The driving assistance system according to claim 4, wherein the processor further executes one or more programs to:
detect an absolute speed of the object; and
determine whether the absolute speed is greater than a predetermined speed threshold; and
in response to determining that the absolute speed of the object is greater than the predetermined speed threshold, perform the determination regarding the instantaneous distance.

6. The driving assistance system according to claim 4, wherein the processor further executes one or more programs to:
determine a type of the object; and
in response to determining that the type of the object is a vehicle, perform the determination regarding the instantaneous distance.

7. The object recognition apparatus according to claim 1, wherein
the currently detected instantaneous distance and the previously detected instantaneous distance are detected in consecutive image frames.

8. The object recognition apparatus according to claim 1, wherein
determining that the distance jump has occurred indicates a decrease in stability of a recognition result in regard to the object based on the currently detected instantaneous distance.

9. The driving assistance system according to claim 4, wherein
the currently detected instantaneous distance and the previously detected instantaneous distance are detected in consecutive image frames.

10. The driving assistance system according to claim 4, wherein determining that the distance jump has occurred indicates a decrease in stability of a recognition result in regard to the object based on the currently detected instantaneous distance.

* * * * *